United States Patent [19]

Einhorn

[11] 4,285,264
[45] Aug. 25, 1981

[54] GENERAL PURPOSE HOLLOW WALL TOGGLE FASTENER

[75] Inventor: Ruediger Einhorn, Katonah, N.Y.
[73] Assignee: Coats & Clark, Inc., Stamford, Conn.
[21] Appl. No.: 39,186
[22] Filed: May 15, 1979
[51] Int. Cl.³ .............................................. F16B 21/00
[52] U.S. Cl. ..................................... 411/345; 411/39; 411/346; 411/386; 411/400; 411/427; 411/437
[58] Field of Search .................. 85/3 R, 1 P, 72, 3 K, 85/3 S; 248/71, 216.3, 220.2, 231.1, 304

[56] References Cited
U.S. PATENT DOCUMENTS

| 231,334 | 8/1880 | Kraus | 85/3 R |
| 4,196,883 | 4/1980 | Einhorn | 85/3 R |

FOREIGN PATENT DOCUMENTS 245860  7/1963  Australia ...................................... 85/3 R Primary Examiner—Robert L. Wolfe
Attorney, Agent, or Firm—Burgess, Ryan & Wayne

[57] ABSTRACT

A hollow wall fastener using a conventional toggle bolt and a toggle anchor which is pointed and which has an open groove for receiving the toggle bolt. An end cap within the anchor has an internally threaded head portion and a frangible portion which allows the head portion to separate from the rest of the end cap when the end of the bolt is threaded into the head portion, thus twisting the frangible portion until it breaks. Thereafter the head portion prevents withdrawal of the toggle bolt from the anchor. The end of the groove has a threaded portion which cooperates with a threaded portion of an aperture opposite the groove to permit the anchor to pivot with respect to the bolt to a position where the bolt is threadably engaged and locked in the threaded portions of the anchor, forming a "T" configuration behind the surface of the hollow wall. Thereafter the bolt may be rotated to draw the anchor tightly against the interior of the hollow wall.

7 Claims, 14 Drawing Figures

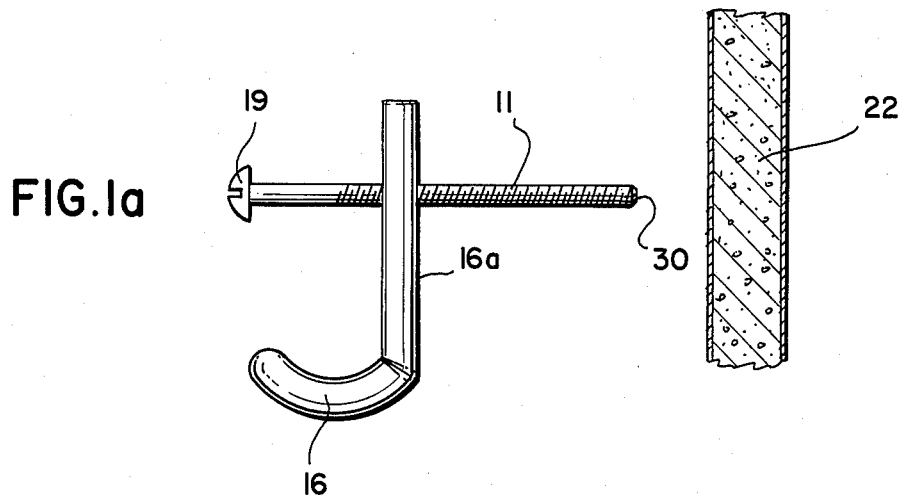
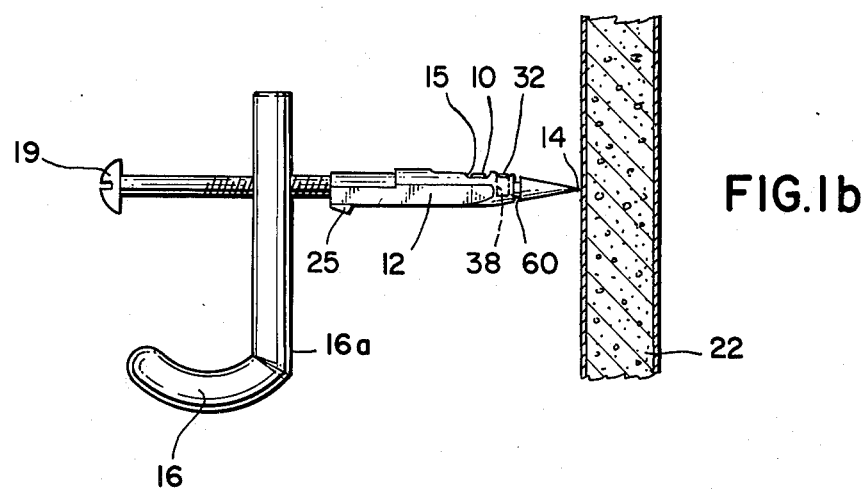
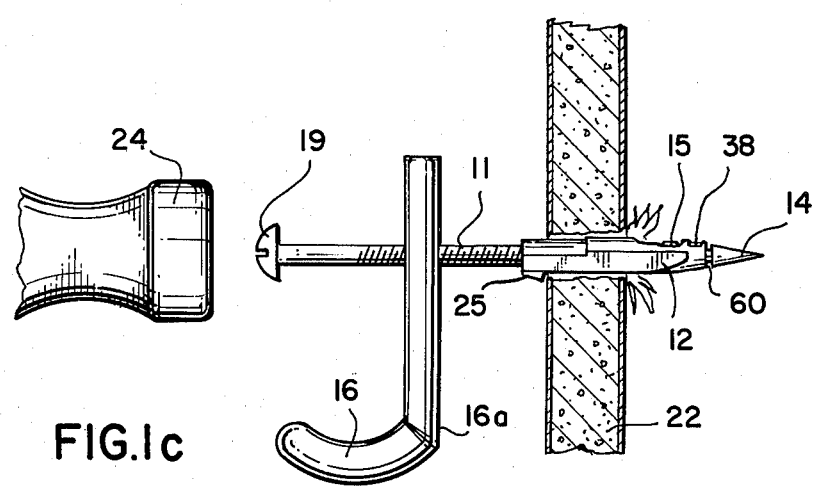

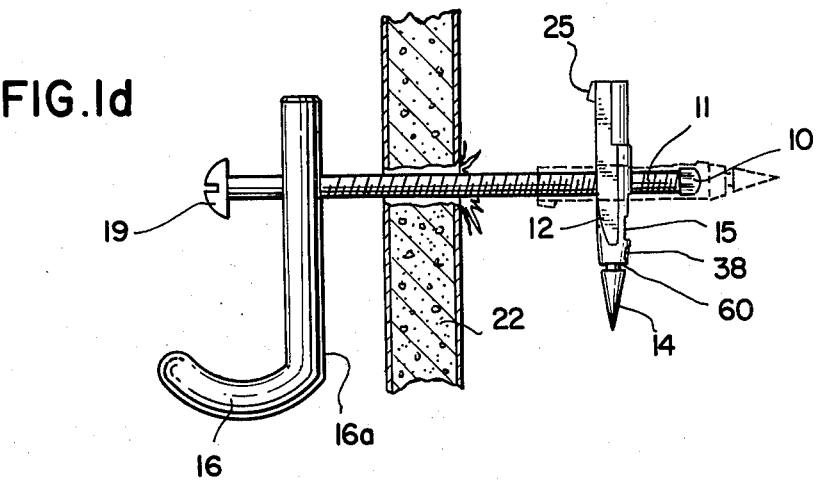
FIG.1d
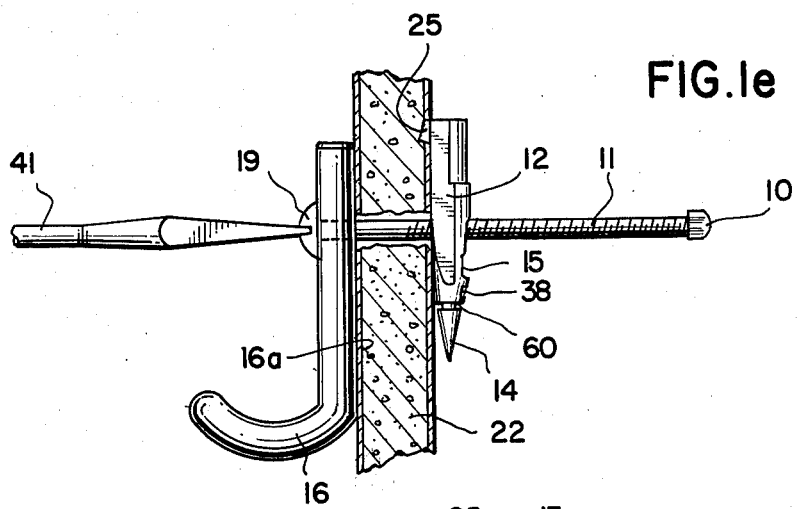
FIG.1e
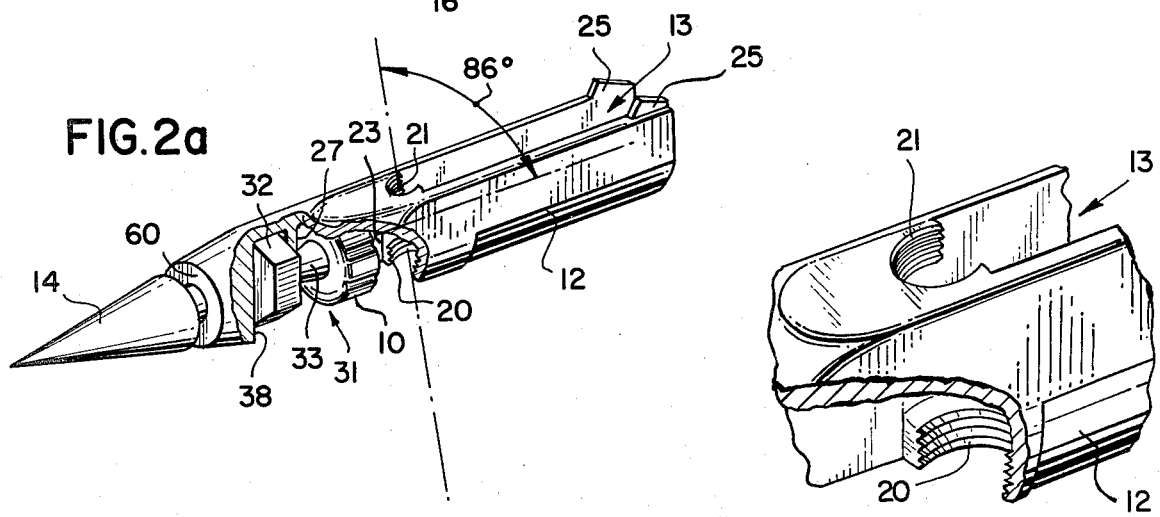
FIG.2a
FIG.2b

GENERAL PURPOSE HOLLOW WALL TOGGLE FASTENER

This invention relates to a hollow wall fastener, and a toggle anchor for use therein.

Hollow wall fasteners are employed where it is desired to secure an object to a hollow wall (such as a sheet rock wall, hollow door, hollow casting, etc.) with greater mounting strength than can be achieved by means of a conventional screw or nail. Hollow wall fasteners of the toggle type generally employ an element which is driven through the hollow wall or inserted in a predrilled hole herein, with the inserted element being thereafter expanded or changing its position so as to prevent removal of the fastener from the wall.

Presently utilized toggle hollow wall fasteners, however, generally require making a hole in the wall (either by impact or drilling) which is much larger than the toggle bolt which extends through the wall surface itself after the installation is completed. The relatively large hole is required to accommodate the bulky toggle element. Thus there is a need for a toggle hollow wall fastener which requires a smaller hole than presently known fasteners for a given toggle bolt diameter, and which is economical to manufacture.

An improved hollow wall toggle fastener is described in U.S. patent application Ser. No. 863,241 filed Dec. 22, 1977 and now U.S. Pat. No. 4,196,883, the disclosure of which is incorporated herein by reference.

The aforementioned improved fastener uses a toggle bolt in conjunction with a toggle anchor which is pointed and which has an open groove for receiving the toggle bolt. The end of the groove has a threaded portion which cooperates with a threaded portion of an aperture opposite the groove to permit the anchor to pivot with respect to the bolt to a position where the bolt is threadably engaged and locked in the threaded portions of the anchor, forming a "T" configuration behind the surface of the hollow wall. Thereafter the bolt may be rotated, e.g. by turning a screw or fastener body, to draw the anchor tightly against the interior of the hollow wall.

However, this new type of toggle arrangement has a drawback in that an additional part, namely a special head similar to but smaller than the screw head 34 shown in FIG. 9 of the aforesaid application, must be threaded onto the end of a conventional toggle bolt in order to adapt the arrangement for general purpose use. See page 10 of said application at lines 14 to 25. Since such special heads are small, they are readily dropped or lost. In addition, a certain degree of manual dexterity is required to screw the toggle bolt into the small special head. These problems adversely affect the commercial marketability and ease of use of the arrangement.

Accordingly, an object of the present invention is to provide an improved general purpose hollow wall toggle fastener of the type described in the aforementioned application.

As herein described there is provided a hollow wall fastener comprising a threaded toggle bolt; means for driving, pulling and rotating said bolt; and an elongated toggle anchor having a longitudinal recess for receiving one end of said bolt in longitudinal alignment with the longitudinal axis of said anchor; an end cap retention recess adjacent and in longitudinal alignment with said longitudinal recess; an end cap having a non-circular retention portion, a frangible intermediate portion, and an internally threaded head portion for threadably engaging said end of said bolt, said retention portion and head portion being disposed in said retention and longitudinal recesses respectively, with said intermediate portion extending therebetween; means permitting pivoting of said anchor with respect to said bolt about a pivot axis within said anchor, from said alignment position to another position in which the longitudinal axis of the anchor is substantially perpendicular to the longitudinal axis of said bolt; and means comprising an approximately semicircular threaded groove in said anchor for locking said bolt and anchor together in snap-fit fashion in mutually threadably engaged relationship in said other position.

According to another aspect of the invention there is provided a hollow wall fastener comprising a threaded toggle bolt; means for driving, pulling and rotating said bolt; and an elongated toggle anchor having a longitudinal recess for receiving one end of said bolt in longitudinal alignment with the longitudinal axis of said anchor; means for preventing longitudinal axial movement of said bolt relative to said anchor while said bolt and anchor are in said alignment; means permitting pivoting of said anchor with respect to said bolt about a pivot axis within said anchor, from said alignment position to another position in which the longitudinal axis of the anchor is substantially perpendicular to the longitudinal axis of said bolt; means comprising an approximately semicircular threaded groove in said anchor for locking said bolt and anchor together in snap-fit fashion in mutually threadably engaged relationship in said other position; and first and second pointed projections disposed on opposite sides of said recess adjacent one end of said anchor remote from said axial movement preventing means, each of said projections having a ramp part extending from said one end of said anchor to the point thereof.

IN THE DRAWINGS

FIGS. 1a to 1e illustrate the manner of installation of a hollow wall fastener according to a preferred embodiment of the invention;

FIG. 2a is a partially cut away perspective view of a toggle anchor according to a preferred embodiment of the invention;

FIG. 2b is an enlarged view of the encircled portion of FIG. 2a;

Figure 3:
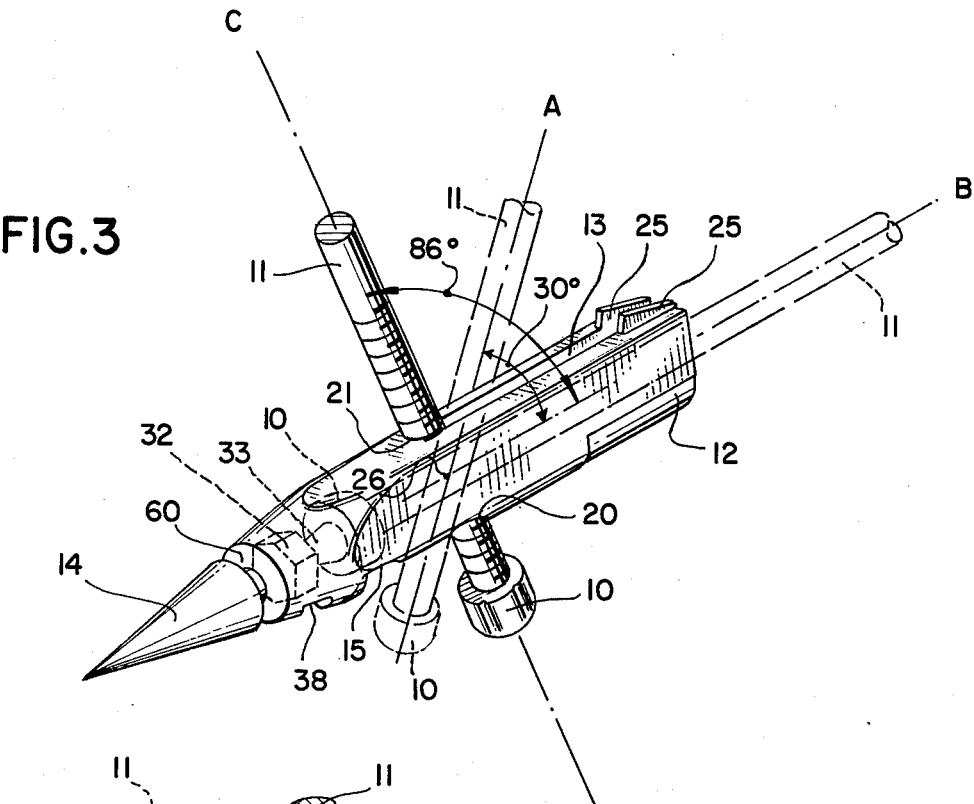
FIG. 3 is a perspective view of the toggle anchor and bolt in various relative positions during the installation process.
Figure 4:
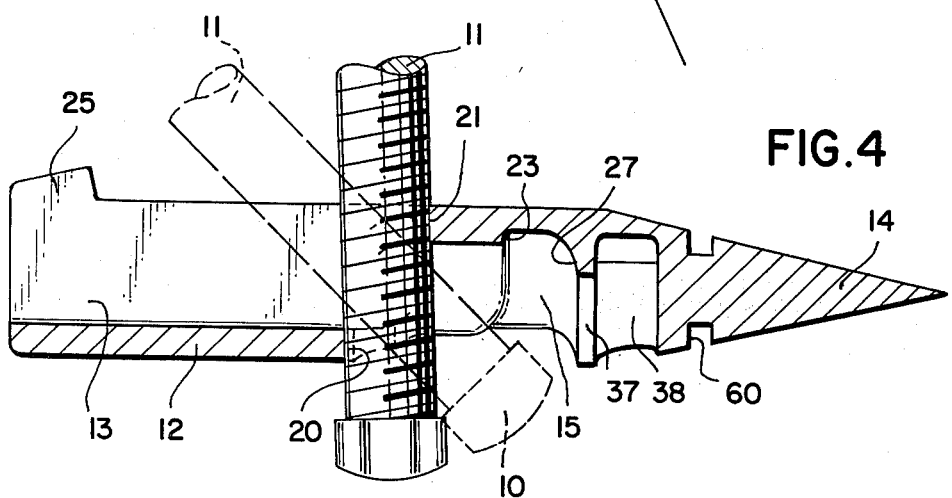
FIG. 4 is a right side elevation view of the toggle anchor.

As seen in FIGS. 1a to 1e, the hollow wall fastener comprises three mutually interactive portions, i.e. a toggle bolt head 10, a threaded toggle bolt 11 the end of which threadably engages the head 10, and an elongated toggle anchor 12 having an open groove 13, a pointed end 14, and an elongated aperture 15 opposite and in communication with the recess 13.

The toggle bolt 11 extends through a hole in a hook 16 having a flat wall mounting surface 16a. Alternatively, the toggle bolt 11 may be welded or otherwise permanently affixed to the hook 16. Preferably, the hook 16 and anchor 12 are formed of a suitable die casting metal such as zinc, and the toggle bolt 11 comprises steel.

One end of the toggle bolt 11 has an integrally formed enlarged slotted end or head 19.

As best seen in FIGS. 2a, 2b and 3, the aperture 15 has a relatively large portion for receiving the head 10, and a relatively small portion 20 which is approximately semicircular and which is threaded to engage the toggle bolt 11 when the same is disposed nearly perpendicular to the longitudinal axis of the anchor 12. The end of the recess 13 also has an approximately semicircular threaded portion 21 for engaging the toggle bolt 11 when it is in said nearly perpendicular position.

Thus, the toggle bolt 11 may assume one of three positions relative to the toggle 12, i.e., (i) an intermediate initial assembly position A (see FIG. 3) (utilized only by the manufacturer and not by the person utilizing the fastener) in which the bolt extends through the relatively large position of the aperture 15 and the portion of the groove 13 adjacent the semicircular end 21 thereof, at an angle of approximately 30° with respect to the longitudinal axis of the anchor 12, (ii) an installation position B in which the bolt 11 is longitudinally aligned with the axis of the anchor 12, with the head 19 of the bolt being disposed within the anchor and the adjacent portion of the bolt being disposed within the groove 13, and (iii) a locking position C in which the bolt 11 threadably engages the approximately semicircular threaded portions 20 and 21 of the anchor body 12, and is disposed nearly perpendicular to the axis of said anchor body.

In FIG. 1a the bolt 11 is shown in its initial position. In FIG. 1b the anchor body 12 is shown in its installation position relative to the bolt 11 (after having been threadably engaged with the head 10). In FIG. 1c the anchor body 12 is shown in its utilization position, and in FIG. 1d the anchor body 12 is in its locking position. FIG. 1e shows the final positions of the hook 16 and anchor body 12 abutting opposite sides of the hollow wall.

The manner in which the fastener comprising parts 10, 11 and 12 is utilized will be best understood by further reference to FIGS. 1a to 1e, which illustrate the installation procedure in a hollow sheet rock wall 22.

Figure 5:
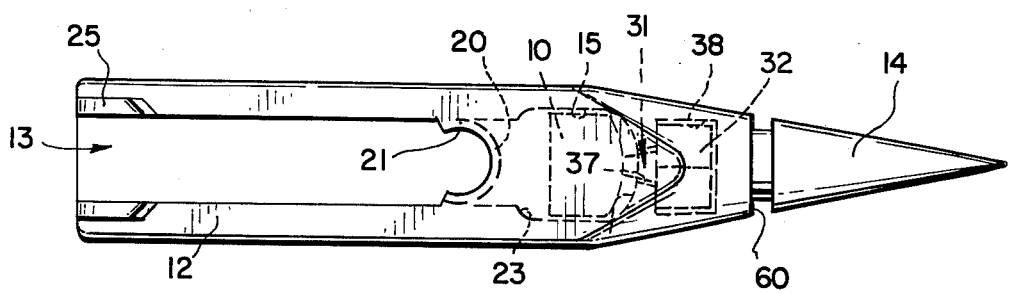
FIG. 5 is a top plan view of said anchor.
Figure 6:
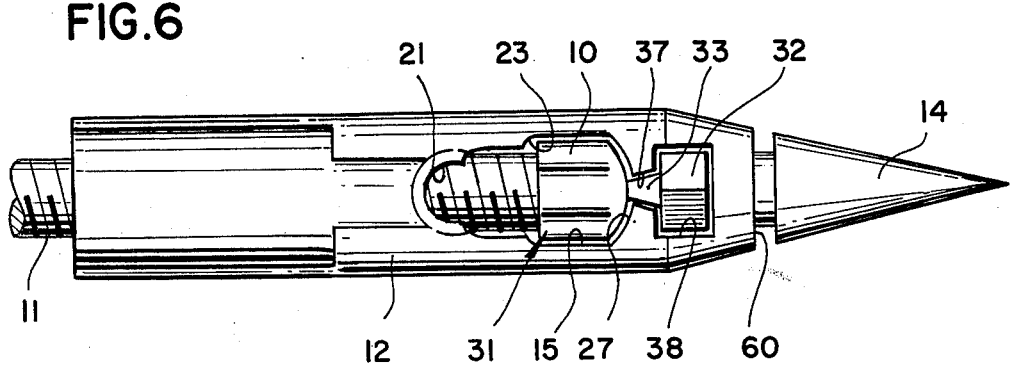
FIG. 6 is a bottom plan view of said anchor.

The bolt 11, head 10 and anchor body 12 are initially assembled with the anchor body 12 in its utilization position relative to the bolt 11, i.e. in axial alignment therewith. This is done by inserting threaded end portion 30 of the bolt 11 through longitudinal recess 13 in the anchor body 12, then threading the bolt end 30 into the head 10 of the end cap 31, which is initially held in place by the retaining portion 32 and intermediate portion 33 of said end cap. Then the bolt 11 is turned to threadably engage its end 30 with the internally threaded aperture of the head 10. Continued turning of the bolt 11 twists the frangible intermediate portion 33 of the end cap 31 to sever the head 10 therefrom. In this position forward axial movement of the block 11 relative to the anchor 12 is prevented by wall 27 (FIGS. 5 and 6) adjacent the solid pointed end 14 of the anchor, and rearward movement of the bolt 11 relative to the anchor 12 is prevented by engagement of the head 10 threadably attached to the bolt 11 with a shoulder 23 formed within the toggle anchor 12. Thus in this utilization position the bolt 11 is prevented from longitudinal axial movement relative to the anchor 12, and these two parts operate as a single unit while the anchor 12 and adjacent end of the bolt 11 are being driven through the wall 22.

The primary function of bolt head 10 is to prevent toggle anchor 12 from falling off bolt 11 behind the hollow wall 22, as might otherwise happen during the anchor rotation step illustrated in FIG. 1d.

A hammer or other suitable impact tool 24 is employed to apply impact forces to the integral head 19 of the toggle bolt 11, to drive the pointed end 14 of the toggle anchor 12 through the wall 22, together with the adjacent portion of the toggle bolt 11. This step is illustrated in FIG. 1c.

Alternatively, the anchor body 12 may be driven alone into the wall 22 until the projections 25 encounter the wall surface, after which the bolt 11 may be threadably engaged with the head portion 10 of the end cap 31, and the anchor driven the rest of the way by striking the bolt head 19.

After the toggle anchor 12 has penetrated entirely through the wall 22, as shown in FIG. 1b, the hook 16 is abruptly rotated or "jiggled" back and forth to dislodge the toggle anchor 12 from its aligned or utilization position relative to the bolt 11, causing the anchor 12 to pivot about the bolt 11 to an intermediate oblique position. Then the hook 16 is pulled away from the wall 22 to draw the toggle anchor 12 against the wall 22. The pointed projections 25 adjacent the recess 13 at the open end of the toggle anchor engage the interior surface of the wall 22 and prevent rotation of the anchor 12 with the bolt 11.

As pulling on the hook 16 continues, the anchor 12 is rotated further, so that the bolt 11 snaps into the threaded recesses 20 and 21 (see FIG. 1d), thus threadably engaging the bolt 11 with said recesses and locking the anchor 12 onto the bolt 11, at an angle such that the longitudinal axis of the anchor 12 is nearly perpendicular to the axis of the bolt 11, i.e. preferably about four degrees short of perpendicularity or at an angle of 86° between the anchor and bolt axes.

Thereafter, the bolt 11 is rotated by means of the screwdriver blade 41 (FIG. 1e) while exerting a pulling force thereon, to maintain the toggle anchor 12 against the interior surface of the wall 22 so that rotation of the anchor is prevented and the bolt 11 may be threaded onto the anchor parts 20 and 21 to tighten the connection, i.e. shorten the distance between the anchor 12 and the hook mounting surface 16a until the hook 16 is secured to the wall 22. During this tightening process the slight angle (approximately $2\frac{1}{2}$°) between the normal to the bolt 11 and the axis of the toggle anchor 12 ensures that the projections 25 solidly engage the interior surface of the wall 22 to prevent rotation of the toggle anchor while the bolt 11 is being rotated. The locking engagement between the bolt 11 and the threaded parts 20 and 21 of the anchor 12 ensures that the anchor 12 does not slide along the bolt 11 to loosen the connection during the intervals between turns of the toggle bolt 11.

We have found that any tendency of the anchor body 12 to jam rather than pivot smoothly upon engagement with the wall 22, is prevented by shaping the projections 25 so that a ramp part thereof extends from the adjacent end of the anchor body 12 to the point of each projection. Preferably the ramp part should extend at an angle of 4° to 6° with respect to the longitudinal axis of the anchor body.

In order to facilitate free pivoting movement of the toggle anchor 12 with respect to the bolt 11, the pivot axis therebetween, i.e. the point of intersection of the longitudinal axes thereof, should preferably be coincident with or close to the center of gravity of the anchor 12.

Preferably, the force required to lock the bolt 11 into threadable engagement with the parts 20 and 21 of the anchor 12, measured at a distance of 2 inches from the pivot point therebetween, should be on the order of 20 to 80 ounces, with a range of 26 to 56 ounces being most desirable.

While the toggle anchor 12 may have a pointed end 14 which is permanently affixed thereto, alternatively a narrowed section 60 may be provided between the pointed end 14 and the remainder of the anchor 12, as shown in FIGS. 1a to 6, so that if desired the pointed end 14 may be removed for installations in which the anchor 12 is to be inserted through a predrilled hole in a hollow wall or door.

The toggle anchor 12 may be made by die casting, with the threaded parts 20 and 21 having threads cut therein in a secondary operation after the die casting step has been completed. As previously mentioned, these threads are cut at an angle approximately 2½° off the normal to the anchor body longitudinal axis, to provide the desired locked position of the anchor such that the projections 25 extend toward the interior surface of the hollow wall within which the anchor 12 is to be installed. However, if the anchor 12 tilts beyond the normal to the wall, projections 25 may not work. Such an anchor would slip around on the inside wall surface and could not be tightened.

The detailed construction of the toggle anchor 12 is shown in FIGS. 2a, 2b and FIGS. 4–6, with FIGS. 2a and 2b showing most clearly the groove 13 and the threaded parts 20 and 21, each of which subtends an angle of slightly greater than 180°, typically 185°–200°. It is this extension of the apertures 20 and 21 beyond a semicircular configuration which provides the snap action fit of the bolt 11 to threadably engage the same. Even a slight knife edge extension beyond 180° on both sides of the apertures 20 and 21 would be sufficient to provide a snap-in feature.

FIG. 3 illustrates the three interactive positions of the bolt 11 relative to the toggle anchor 12, as they are mutually rotated about the phantom or imaginary pivot point 26. The intermediate initial assembly position, i.e., wherein the bolt 11 is initially inserted into the anchor 12, is indicated at A; the installation position is indicated at B, wherein the longitudinal axes of the bolt 11 and toggle anchor 12 are mutually aligned, with the head 10 threadably engaged with the bolt 11 being disposed within the body of the anchor 12. As is most clearly visible in FIG. 3, the forward portion of the anchor 12 adjacent the pointed end 14 thereof terminates in a curved wall 27 which is contoured to abut the head 10 threadably engaged with the bolt 11. The locked position of the bolt 11, in which it threadably engages the apertures 20 and 21, is illustrated at C.

Figure 7A:
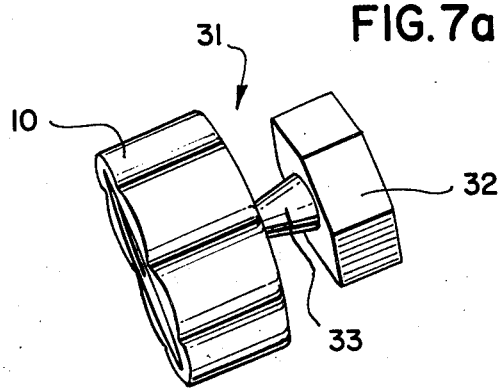
FIG. 7a shows a perspective view of the end cap utilized in the toggle anchor.
Figures 7B, 7C:
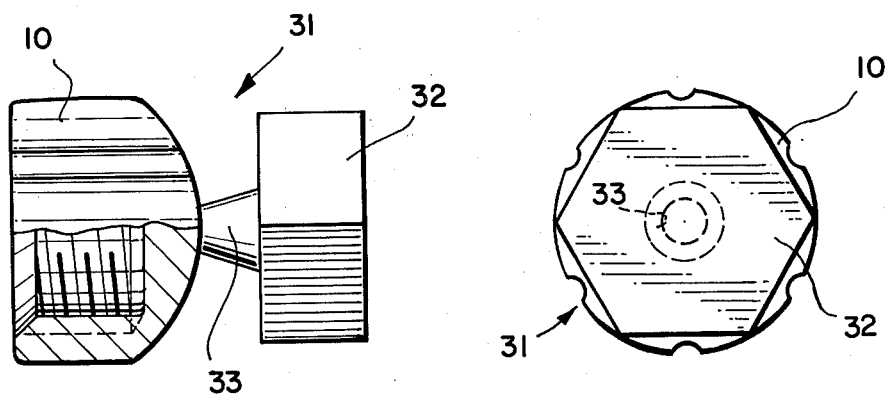
FIG. 7b is a right side view of said end cap.
FIG. 7c is a rear elevation view of said end cap.

On the opposite side of the wall 27 from the longitudinal recess 13 is a retention recess 38 for receiving the end cap retention portion 32 (see FIGS. 7a, 7b and 7c). The frustoconical intermediate portion 33 of the end cap 31 extends between the retention portion 32 and head portion 10 thereof through a transverse slot 37 in the wall 27.

Thus the end cap 31 is initially installed by the manufacturer or it may alternatively be installed by the user of the fastener, depending upon considerations of assembly cost and customer convenience, within the anchor body 12 by disposing the non-circular retention portion 32 thereof in the mating retention recess 38, with the head portion 10 disposed at the end of the recess 13 adjacent the wall 27.

End cap 31 is preferably press fitted onto the threads of toggle anchor 12, the press fit of 32 prevents end cap 31 from falling out during shipping and also before actual use.

As the end 30 of the toggle bolt 11 is threaded into the head 10, the intermediate portion 33 of the end cap 31 initially prevents rotation of the head 10 and thus permits the threadable engagement of the head 10 with the toggle bolt end 30.

After the toggle bolt 11 is threaded into the head portion 10 of the end cap 31, further rotation of the bolt 11 twists the intermediate portion 33 and causes it to break, releasing the head portion 10.

The torsional resistance of the intermediate portion 32 is sufficiently high to insure full threadable engagement of the bolt end 30 with the head 10 before said intermediate portion breaks; and sufficiently low so as not to require application of an unduly high torque to cause breakage. This torsional resistance should preferably be in the range of ¾ to 1½ inch-ounces.

Due to the frustoconical shape of the intermediate portion 32 with the smaller diameter end adjacent the head portion 10, breakage occurs at the head portion 10, leaving a "clean" head without any significant protuberance which might otherwise impair free movement thereof.

The retention portion 32 of the end cap 31 is preferably in the shape of a regular hexagon to provide a self-rotating action facilitating insertion in the retention recess 38. Other polygonal shapes may alternatively be employed. The end cap 31 is preferably an injection molded plastic part with nylon being the preferred plastic.

What is claimed is:

1. A hollow wall fastener comprising:
   a threaded toggle bolt;
   means for driving, pulling and rotating said bolt; and
   an elongated toggle anchor having:
      a longitudinal recess for receiving one end of said bolt in longitudinal alignment with the longitudinal axis of said anchor;
      an end cap retention recess adjacent and in longitudinal alignment with said longitudinal recess, said recesses being separated by a wall portion of said toggle anchor having a transverse slot therein providing communication between said recesses;
      an end cap having a non-circular retention portion, a frangible intermediate portion having a width less than the width of said slot, and an internally threaded head portion for threadably engaging said end of said bolt,
      said retention portion and head portion being disposed in said retention and longitudinal recesses respectively, with said intermediate portion extending therebetween through said slot;
      means permitting pivoting of said anchor with respect to said bolt about a pivot axis within said anchor, from said alignment position to another position in which the longitudinal axis of the anchor is substantially perpendicular to the longitudinal axis of said bolt; and means comprising an approximately semicircular threaded groove in said anchor for locking said bolt and anchor together in snap-fit fashion mutually threadably engaged relationship in said other position.

2. The fastener according to claim 1, wherein said intermediate portion of said end cap has a frustoconical shape.

3. The fastener according to claim 2, wherein the smaller diameter end of said intermediate portion is adjacent said head portion of said end cap.

4. The fastener according to claim 1, wherein said retention portion of said end cap is polygonal.

5. The fastener according to claim 1, wherein said retention portion of said end cap has the shape of a regular hexagon.

6. A hollow wall fastener comprising:

a threaded toggle bolt;

means for driving, pulling and rotating said bolt; and an elongated toggle anchor having:

a longitudinal recess for receiving one end of said bolt in longitudinal alignment with the longitudinal axis of said anchor;

an end cap retention recess adjacent and in longitudinal alignment with said longitudinal recess;

an end cap having a non-circular retention portion, a frangible intermediate portion, and an internally threaded head portion for threadably engaging said end of said bolt, said retention portion and head portion being disposed in said retention and longitudinal recesses respectively, with said intermediate portion extending therebetween;

means permitting pivoting of said anchor with respect to said bolt about a pivot axis within said anchor, from said alignment position to another position in which the longitudinal axis of the anchor is substantially perpendicular to the longitudinal axis of said bolt; and means comprising an approximately semicircular threaded groove in said anchor for locking said bolt and anchor together in snap-fit fashion in mutually threadably engaged relationship in said other position.

7. A hollow wall fastener comprising:

a threaded toggle bolt;

means for driving, pulling and rotating said bolt; and an elongated toggle anchor having:

a longitudinal recess for receiving one end of said bolt in longitudinal alignment with the longitudinal axis of said anchor;

means releasably secured within said recess for engaging said one end of said bolt to prevent longitudinal axial movement of said bolt relative to said anchor while said bolt and anchor are in said alignment;

means permitting pivoting of said anchor with respect to said bolt about a pivot axis within said anchor, from said alignment position to another position in which the longitudinal axis of the anchor is substantially perpendicular to the longitudinal axis of said bolt; and means comprising an approximately semicircular threaded groove in said anchor for locking said bolt and anchor together in snap-fit fashion in mutually threadably engaged relationship in said other position.

* * * * *

UNITED STATES PATENT AND TRADEMARK OFFICE
CERTIFICATE OF CORRECTION

PATENT NO. : 4,285,264
DATED : August 25, 1981
INVENTOR(S) : Ruediger Einhorn

It is certified that error appears in the above—identified patent and that said Letters Patent is hereby corrected as shown below:

Column 1, line 14: "herein" should be --therein--.

line 30: after "1977", delete "and".

Signed and Sealed this

Twentieth Day of July 1982

[SEAL]

Attest:

GERALD J. MOSSINGHOFF

Attesting Officer

Commissioner of Patents and Trademarks